Patented Sept. 5, 1939

2,171,966

UNITED STATES PATENT OFFICE 2,171,966

PROCESS FOR REDUCING KIESERITE

Hans Zirngibl, Bitterfeld, and Robert Griessbach, Wolfen, kreis Bitterfeld, Germany, assignors to I. G. Farbenindustrie Aktiengesellschaft, Frankfort-on-the-Main, Germany No Drawing. Application July 2, 1936, Serial No. 88,594. In Germany July 3, 1935

5 Claims. (Cl. 23—181)

The present invention relates to a process for reducing kieserite with formation of magnesium oxide and hydrogen sulfide or, if desired, of sulfur.

Various methods have been proposed for producing magnesium oxide and sulfur from kieserite. Decomposition by heating with carbon does not afford pure magnesia, so that this process is not useful. Magnesium sulfate free from anhydrite has therefore been reduced by hot water gas having a high hydrogen content or by heated hydrogen, whereby pure magnesium oxide and sulfur are obtained together with sulfur dioxide and hydrogen sulfide. It has been proposed to use the hydrogen so as to obtain magnesia and sulfur in two stages. In the first stage magnesium oxide and sulfurous acid are obtained by using a limited quantity of hydrogen, in the second stage the sulphurous acid is reduced to sulfur by means of an excess of hydrogen.

The present invention consists in producing pure magnesium oxide, hydrogen sulfide, or pure sulfur in a single stage process by reduction of the kieserite with heated gases containing hydrogen and kept in circulation in the presence of a catalyst stable towards hydrogen sulfide, for example, the oxide and sulfide of iron, copper, molybdenum, tungsten and the like.

The use, new per se, of a catalyst in the reduction of kieserite with hydrogen has various noteworthy advantages. Thus the reaction, which has hitherto been a two-stage endothermic reaction, can now be carried out in one reaction furnace and as a whole exothermically and, if desired, only in the direction affording pure sulfur. The reaction proceeds in the presence of a catalyst at a far lower temperature and in a shorter time than in the absence of one. While without this catalyst 4 hours at a temperature of 800° C. is necessary for quantitative reduction, with such a catalyst a temperature of only 700° C. and a reduction time of 2 hours are required. The lower temperature and shorter time are essential if trouble is to be avoided with the furnace, since by this means the troublesome caking and agglomeration which always occur at high temperatures are avoided.

It is specially advantageous, particularly when a shaft furnace is used, if the kieserite is pressed into moulds of suitable size. For this purpose the kieserite may be mixed with a small proportion of magnesia and the catalyst and kneaded with a solution of magnesium chloride saturated in the cold; the mass is then moulded in a steam heated press. After heating the mould to 700° to 750° C., whereby practically all the chlorine is given off as hydrogen chloride, an exceedingly firm body is obtained which contains only about 0.01 to 0.05 per cent. of residual chlorine and has the further advantage that it shows less tendency than the unmoulded material to agglomerate. The mould is then heated in a rotary kiln, and from there it is led preferably immediately through an air lock into the reduction furnace, which is a heat gas-tight insulated kiln lined with ceramic material. In this way all the heat necessary for the reaction is introduced into the furnace in a highly economical manner, so that in general only heat losses have to be covered. The reducing gas which in the case of the production of hydrogen sulfide is hydrogen and in the case of the production of sulfur may be a mixture of about 50 to 60 per cent. hydrogen sulfide and 50 to 40 per cent. hydrogen, preheated to about 700° C., is blown into the furnace where it meets the kieserite which is being introduced. In the latter case the hydrogen sulfide may be produced by complete reduction of the kieserite in a first stage. When circulating it together with the hydrogen in excess, the desired mixture may be easily adjusted. On the other hand, hydrogen sulfide of another source may be used and mixed with the reducing hydrogen. Finally, hydrogen sulfide can be used without admixture of hydrogen as a reducing gas.

A particularly advantageous method of carrying out the invention consists in producing only either hydrogen sulfide or pure sulfur (hydrogen sulfide recovery) employing for the former a large excess of hydrogen or gas containing hydrogen, such as water gas, and for the latter hydrogen sulfide in excess. This excess is attained by circulating the gas at such a velocity, or adjusting the through-put of the furnace in such a way that in unit time a quantity of reducing gas many times that which is necessary for the reaction is present in the furnace.

It is suprising that by circulating hydrogen in large excess over the magnesium sulfate practically only a single sulfur compound, namely hydrogen sulfide, is produced, while hitherto by similar processes always mixtures of two and more sulfur compounds have been produced. The hydrogen sulfide which is formed is continuously washed from the circulating system by suitable solvents, for example certain aminoacids. When water gas is used instead of hydrogen carbon dioxide is also produced, which is washed out of circulation together with the hydrogen sulfide.

If, on the other hand, one works with an excess of hydrogen sulfide, elementary sulfur in a very pure form is obtained as the sole sulfur reaction product. It is indeed known to produce sulfur from kieserite or magnesium sulfate by hydrogen sulfide in excess, only no method has been pointed out in this process whereby the added hydrogen sulfide is completely transformed into sulfur.

The examples following hereinafter, serve to illustrate the invention, the parts being by weight:

Production of H₂S and MgO

Example 1.—90 parts of milled kieserite containing 85 per cent. MgSO₄ are intimately mixed with 10 parts MgO and 0.2 part Fe₂O₃ in the form of iron nitrate. Into this mixture 10 parts by volume of cold saturated magnesium chloride solution is sprayed, and the mass is thereupon moulded in a steam heated press to form pieces of the size of walnuts. These pieces are then heated in a rotary kiln to 700 to 750° C. and thence immediately transferred into a shaft reduction furnace. Here hydrogen in excess heated to 700° C. meets the kieserite descending the shaft. The excess of hydrogen is such that per unit time ten times as much hydrogen as is necessary for the reaction passes through the furnace. The material remains some 2 to 3 hours in the furnace, whereby magnesium oxide is produced. The gases consisting of hydrogen, hydrogen sulfide and steam, leave the oven at about 600° C. and, after passing through a dust separator and heat exchanger are cooled to 20° C. by circulating water sprays. Finally the hydrogen sulfide is washed out in a washer through which alanine trickles. After replenishment with fresh hydrogen the gas is led by means of a blower through the heat exchanger to an electrical resistance heater lined with refractory carbon.

Production of S and MgO

Example 2.—Instead of washing out the hydrogen sulfide formed under the conditions of the foregoing example, it may be circulated with the hydrogen and serve as a further reducing agent; under these conditions magnesia and pure sulfur together with the correspondent amount of water is produced, this sequence of reactions being expressed by the summation equation:

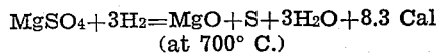

$$MgSO_4 + 3H_2 = MgO + S + 3H_2O + 8.3 \text{ Cal}$$
(at 700° C.)

Under these conditions the formation of sulfur dioxide is completely avoided. The gases leaving the oven at about 600° C. are freed from dust and then cooled to about 150° C., whereby the sulfur condenses to a fluid and is continuously withdrawn. The sulfur still remaining is separated in an electric dust depositing chamber and the gas leaving this chamber, is freed from the greater part of the water by direct contact with sprinkled water (about 25° C.) and is thereupon led through a heat exchanger to an electrical resistance heater which is lined with a refractory material capable of withstanding the reaction, such as silicon carbide or retort graphite.

The energy losses in the process may also be made good by combustion of part of the circulating gases with introduced oxygen instead of by an electrical preheater.

The hydrogen consumed in the reaction is continually made good in the form of fresh hydrogen.

The sulfur is recovered quantitatively and in full purity. The magnesia contains only small quantities of impurities, which are due partly to the raw material and partly to the addition of the catalyst, but are for many purposes without consequence.

Instead of a shaft furnace a rotary kiln may be used, which is provided at both ends with a labyrinthine seal to ensure that the kiln is gastight. In this case the kieserite need not necessarily be pressed hot. It suffices in certain circumstances to moisten the material, well mixed with about 0.2 per cent. of an ore dust rich in copper, wtih a solution of magnesium chloride and to feed it to the preheating chamber of the reduction furnace.

Example 3.—Moulded pieces of kieserite containing a catalyst are heated to 700° C. in a rotary kiln and immediately transferred to the reaction furnace. Here a mixture preheated to about 700° C. of about equal parts of hydrogen sulfide and hydrogen meets the kieserite as it descends the shaft. The material remains about 2 to 3 hours in the furnace, whereupon it emerges as pure magnesium oxide. The gases leaving the furnace at about 600° C. are, after passing through a dust separator and heat exchanger, cooled to about 150° C. by water sprays. The sulfur thereby condenses to the fluid form and is continuously withdrawn through an overflow. In an electric dust separator placed on the outlet side, the last portions of sulphur down to some tenths of a gram per cu. m. are separated. In a further cooler the gases are freed from the greater part of their water by direct contact with trickling cold water, and are thereupon led by means of a blower through a heat exchanger to an electrical resistance heater lined with silicon carbide.

The gas or mixture of gases circulated in this way have a double function, first that of a reducing agent, and secondly that of a heat carrier for the propagation of the reaction.

Example 4.—Moulded pieces of kieserite containing a catalyst are heated to 700° C. in a rotary kiln and immediately transferred to the reaction furnace. On the kieserite in counter-current thereto impinges hydrogen sulfide heated to 700° C. The reaction gases, consisting in this case of sulfur vapor in addition to the excess hydrogen sulfide and steam, leave the oven at 600° C. and after passing through a dust separator and heat exchanger in which a part of the sulfur is separated as fluid, are led through an electrical dust separator; this operates at 130° C. In it the rest of the sulfur is separated from the gas. Finally the water is separated from the gas mixture by sprays of circulating water. A blower leads the gas, after addition of fresh hydrogen sulfide, back through a heat exchanger into an electrical furnace lined with refractory carbon.

What we claim is:

1. The process for reducing kieserite with formation of magnesia and a single reduction product of the SO₃ radicle in one stage which comprises contacting the kieserite in the presence of a catalyst of the group consisting of oxides and sulfides of iron, copper, molybdenum and tungsten, with a reducing agent of the group consisting of hydrogen and hydrogen sulfide, heated to about 700° C. and kept in circulation at least ten times the theoretically necessary quantity of reacting gas being contacted with each quantity of kieserite.

2. The process for reducing kieserite with formation of magnesia and a single reduction of the SO₃ radicle in one stage which comprises contacting the kieserite in the presence of a catalyst of the group consisting of oxides and sulfides of iron, copper, molybdenum and tungsten with a mixture of hydrogen and hydrogen sulfide, heated to about 700° C. and kept in circulation at least ten times the theoretically necessary quantity of reacting gas being contacted with each quantity of kieserite.

3. The process for reducing kieserite with formation of magnesia and a single reduction product of the SO₃ radicle in one stage which comprises mixing kieserite with MgO and a catalyst of the group consisting of oxides and sulfides of iron, copper, molybdenum and tungsten, spraying it with a cold saturated magnesium chloride solution, moulding the mass by pressing to form pieces, heating them to about 700 to 750° C. and contacting the hot moulded pieces of kieserite with a reducing agent of the group consisting of hydrogen and hydrogen sulfide heated to about 700° C. and kept in circulation at least ten times the theoretically necessary quantity of reacting gas being contacted with each quantity of kieserite.

4. The process for reducing kieserite with formation of magnesia and hydrogen sulfide which comprises contacting moulded pieces of kieserite containing a catalyst of the group consisting of oxides and sulfides of iron, copper, molybdenum, tungsten, at a temperature of about 700° C. at least ten times the theoretically necessary quantity of hydrogen being contacted with each quantity of kieserite, removing the hydrogen and hydrogen sulfide thereby produced from the reaction mass, washing out the hydrogen sulfide, reheating the hydrogen and reintroducing it into the reducing zone.

5. The process for reducing kieserite with formation of magnesia and sulfur which comprises contacting moulded pieces of kieserite containing a catalyst of the group consisting of oxides and sulfides of iron, copper, molybdenum, tungsten, at a temperature of about 700° C. at least ten times the theoretically necessary quantity of hydrogen being contacted with each quantity of kieserite, circulating the gas mixture formed, during circulation cooling the gas mixture to about 150° C. thus condensing the sulfur, freeing the gas from water, reheating it to about 700° C. and reintroducing it into the reduction zone.

HANS ZIRNGIBL.
ROBERT GRIESSBACH.